(12) United States Patent
Jiang et al.

(10) Patent No.: US 11,800,513 B2
(45) Date of Patent: Oct. 24, 2023

(54) METHOD OF INFORMATION TRANSMISSION IN UNLICENSED BAND, TERMINAL, AND NETWORK DEVICE

(71) Applicant: VIVO MOBILE COMMUNICATION CO., LTD., Guangdong (CN)

(72) Inventors: Lei Jiang, Guangdong (CN); Xueming Pan, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 79 days.

(21) Appl. No.: 16/756,558

(22) PCT Filed: Sep. 11, 2018

(86) PCT No.: PCT/CN2018/104955
§ 371 (c)(1),
(2) Date: Apr. 16, 2020

(87) PCT Pub. No.: WO2019/076171
PCT Pub. Date: Apr. 25, 2019

(65) Prior Publication Data
US 2020/0337069 A1    Oct. 22, 2020

(30) Foreign Application Priority Data
Oct. 20, 2017    (CN) .......................... 201710984041.2

(51) Int. Cl.
*H04W 72/1268*    (2023.01)
*H04W 16/14*    (2009.01)
(Continued)

(52) U.S. Cl.
CPC ....... *H04W 72/1268* (2013.01); *H04W 16/14* (2013.01); *H04W 72/23* (2023.01); *H04W 74/0808* (2013.01)

(58) Field of Classification Search
CPC . H04W 72/1268; H04W 16/14; H04W 72/14; H04W 74/0808
See application file for complete search history.

(56) References Cited

U.S. PATENT DOCUMENTS

2013/0223251 A1    8/2013    Li et al.
2015/0245271 A1*   8/2015    Balasubramanian ........................
                                                         H04W 36/245
                                                         455/437
(Continued)

FOREIGN PATENT DOCUMENTS

CN    104507108 A    4/2015
CN    106255206 A    12/2016
WO    2017047973 A1    3/2017

OTHER PUBLICATIONS

Extended European Search Report dated Oct. 2, 2020, issued in PCT/CN2018/104955.
(Continued)

*Primary Examiner* — Kevin M Cunningham
(74) *Attorney, Agent, or Firm* — BROOKS KUSMAN P.C.

(57) ABSTRACT

A method of information transmission in an unlicensed band, a terminal, and a network device are provided. The method includes: listening to a channel of a first bandwidth part in an unlicensed band, to acquire a channel listening result; wherein the first BWP is one or more BWPs corresponding to received uplink grant scheduling information and/or received pre-configured information for uplink transmission resource; activating if the channel listening result indicates that a BWP with an idle channel exists in the first BWP, at least one BWP selected from the BWP with the idle channel, to acquire a first active BWP; sending information to a network device on the first active BWP.

16 Claims, 4 Drawing Sheets

(51) Int. Cl.
    *H04W 74/08*     (2009.01)
    *H04W 72/23*     (2023.01)

(56) References Cited

U.S. PATENT DOCUMENTS

| 2018/0255578 | A1 | 9/2018 | Kim et al. | |
|---|---|---|---|---|
| 2019/0044676 | A1* | 2/2019 | Li | H04W 74/0808 |
| 2020/0154399 | A1* | 5/2020 | Zhu | H04W 72/02 |

OTHER PUBLICATIONS

3GPP TSG RAN WG1 Meeting NR#3, R1-1716109, "Remainng issues on bandwidth parts for NR", Nagoya, Japan, Sep. 18-21, 2017, 5 pages.

3GPP TSG RAN WGI Meeting 90bis, R1-1718327, "Remaining Details on Bandwidth Part Operation in NR", Prague, Cz,gth—Oct. 13, 2017, 13 pages.

3GPP TSG RAN Meeting #77, RP-171867, "Preliminary overview of new features for NR in Rel-16", Sapporo, Japan, Sep. 11-14, 2017, 6 pages.

Huawei, Control plane impacts for Bandwidth Parts; 3GPP TSG-RAN WG2 Meeting #99bis; R2-1710457; Oct. 13, 2017; 5 pages.

Written Opinion and International Search Report dated Apr. 30, 2020 issued in PCT/CN2018/104955.

* cited by examiner

METHOD OF INFORMATION TRANSMISSION IN UNLICENSED BAND, TERMINAL, AND NETWORK DEVICE

CROSS-REFERENCE TO RELATED APPLICATION

This application is a U.S. national phase application of a PCT Application No. PCT/CN2018/104955 filed on Sep. 11, 2018, which claims priority to a Chinese Patent Application No. 201710984041.2 filed in China on Oct. 20, 2017, the disclosure of which is incorporated herein by reference in its entirety.

TECHNICAL FIELD

The present disclosure relates to the field of communication technology, and in particular, relates to a method of information transmission in an unlicensed band, a terminal, and a network device.

BACKGROUND

In future $5^{th}$ Generation (5G) communication systems, or New Radio (NR) systems, unlicensed bands may be used as a supplement to licensed bands, to help operators to expand services. In order to be consistent with a NR deployment and maximize NR-based access in an unlicensed frequency band as much as possible, the unlicensed bands may be configured in a frequency bands of 5 GHz, 37 GHz, and 60 GHz. A large bandwidth (80 MHz or 100 MHz) in the unlicensed bands may reduce implementation complexity of network devices and terminals. Since unlicensed bands are shared by a plurality of Radio Access Technologies (RATs), such as WiFi, radar, Long Term Evolution License Assisted Access (LTE-LAA), etc., in some countries or regions, usage of the unlicensed bands must comply with certain regulations to ensure that all devices may use resource fairly, such as Listen Before Talk (LBT), Maximum Channel Occupancy Time (MCOT) and other rules.

In a NR system, a maximum Channel Bandwidth of each carrier may reach 400 MHz. However, considering capability of a terminal, the maximum bandwidth supported by the terminal may be less than 400 MHz, and the terminal may operate on a plurality of small Bandwidth Parts (BWP). Each bandwidth part corresponds to Numerology, a Bandwidth, and a Frequency Location. A network device may configure more than one BWP for a terminal. In such a case, the network device needs to tell the terminal on which BWP the terminal will operate, i.e., which BWP is activated. Activation or deactivation of a BWP may be indicated by a Downlink Control Information (DCI) signaling. After the terminal receives an activation or deactivation instruction, transmission is performed on a corresponding active BWP. In an unlicensed band, the network device or the terminal also need to perform channel listening before the transmission is performed on the active BWP. Information may only be transmitted in a case that the channel is idle. In a case that the channel listening is performed only to the active BWP, and if the channel is detected as busy, the network device or the terminal may not transmit, but other inactive BWPs configured by the network device for the terminal may be idle, and this part of resources will be wasted.

SUMMARY

Some embodiments of the present disclosure provide a method of information transmission in an unlicensed band, a terminal, and a network device, so as to solve a problem in the related art that other available but inactivated BWP resources are wasted due to listening only an active BWP.

In a first aspect, some embodiments of the present disclosure provide a method of information transmission in an unlicensed band. The method is applied to a terminal and includes: listening to a channel of a first bandwidth part (BWP) in an unlicensed band, to acquire a channel listening result; wherein the first BWP is one or more BWPs corresponding to received uplink grant scheduling information and/or received pre-configured information for uplink transmission resource; activating, in a case that the channel listening result indicates that a BWP with an idle channel exists in the first BWP, at least one BWP selected from the BWP with the idle channel, to acquire a first active BWP; sending information to a network device on the first active BWP.

In a second aspect, some embodiments of the present disclosure further provide a terminal, and the terminal includes: a first listening module, used to listen to a channel of a first bandwidth part (BWP) in an unlicensed band, to acquire a channel listening result, wherein, the first BWP is one or more BWPs corresponding to received uplink grant scheduling information and/or received pre-configured information for uplink transmission resource; a first processing module, used to activate, in a case that the channel listening result indicates that a BWP with an idle channel exists among the first BWP, at least one BWP selected from the BWP with the idle channel, to acquire a first active BWP; a first sending module, used to send information to a network device on the first active BWP.

In a third aspect, some embodiments of the present disclosure provide a terminal, and the terminal includes a processor, a storage, and a computer program stored on the storage and executable by the processor, wherein in a case that the computer program is executed by the processor, the processor implements steps of the method of information transmission in an unlicensed band described above.

In a fourth aspect, some embodiments of the present disclosure provide a method of information transmission in an unlicensed band. The method is applied to a network device and includes: sending, to a terminal, uplink grant scheduling information and/or pre-configured information for uplink transmission resource used to indicate one or more BWP in an unlicensed band; receiving information sent by the terminal on the one or more BWPs.

In a fifth aspect, some embodiments of the present disclosure further provide a network device, and the network device includes: a configuring module, used to send, to a terminal, uplink grant scheduling information and/or pre-configured information for uplink transmission resource used to indicate one or more BWPs in an unlicensed band; a second receiving module, used to receive information sent by the terminal on the one or more BWPs.

In a sixth aspect, some embodiments of the present disclosure provide a network device, the network device includes a processor, a storage, and a computer program stored on the storage and executable by the processor, wherein in a case that the computer program is executed by the processor, the processor implements steps of the method of information transmission in an unlicensed band described above.

In a seventh aspect, some embodiments of the present disclosure also provide a computer readable storage medium. The computer readable storage medium includes a computer program stored on the computer readable storage medium, wherein in a case that the computer program is executed by a processor, the computer program implements steps of the method of information transmission in an unlicensed band described above.

In this way, the method of information transmission in the unlicensed band, the terminal and the network device in some embodiments of the present disclosure listens to a plurality of configured BWPs in the unlicensed band, and performs transmission on BWPs with idle channels. For uplink transmission, the terminal listens to at least one BWP scheduled by the uplink grant, and activates the BWP with the idle channel to acquire the first active BWP, and the terminal also transmits uplink information to the network device on the first active BWP. In this way, by listening to the plurality of BWPs, in a case that a certain BWP is busy, other BWPs may be used for transmission, thereby improving resource utilization.

BRIEF DESCRIPTION OF THE DRAWINGS

In order to more clearly illustrate technical solutions in embodiments of the present disclosure, drawings used in description of the embodiments of the present disclosure will be briefly introduced below. Obviously, the drawings in the following description are only some embodiments of the present disclosure. Based on these drawings, other drawings may also be obtained by a person of ordinary skills in the art without paying any creative work.

DETAILED DESCRIPTION

Figure 1:
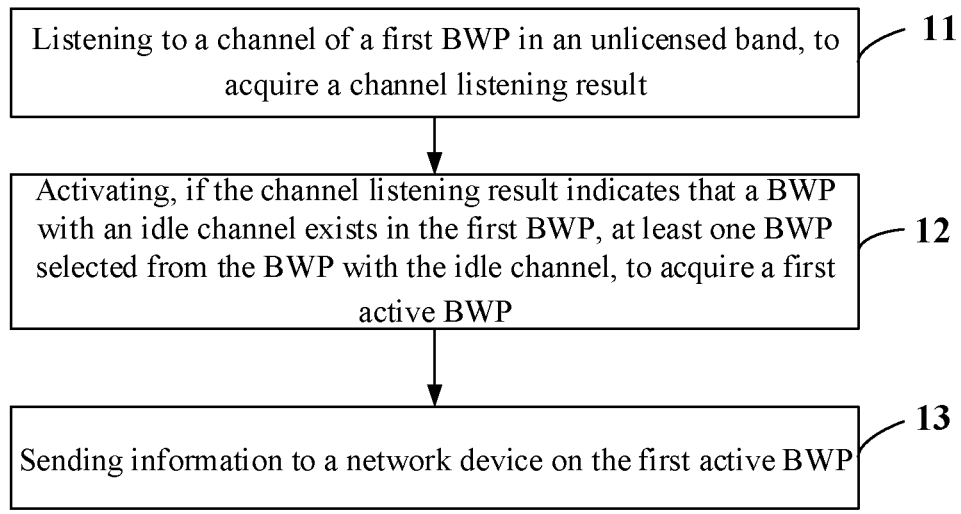
FIG. 1 is a schematic flowchart illustrating an information transmission method on a terminal side in some embodiments of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms, but may not be limited by the embodiments described herein. Rather, these embodiments are provided so that the present disclosure may be thoroughly understood, and the scope of the present disclosure may be completely conveyed to those skilled in the art.

Such terms as "first", "second" and the like in the specification and claims of the present application are used to distinguish similar objects, but are not necessarily used to describe a particular order or chronological order. It is to be understood that terms used in such a way may be interchangeable under appropriate circumstances, so that the embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices.

As shown in FIG. 1, a method of information transmission in an unlicensed band of some embodiments of present disclosure is applied to a terminal, and includes the following steps.

Step 11: listening to a channel of a first bandwidth part (BWP) in an unlicensed band, to acquire a channel listening result.

The first BWP is one or more BWPs corresponding to uplink grant scheduling information and/or pre-configuration information for uplink transmission resource, the uplink grant scheduling information and/or the pre-configuration information is received by the terminal; the first BWP refers to one or more BWPs scheduled or configured by a network device for the terminal, and refer to the type of the one or more BWPs rather than the number of the one or more BWPs. The network device may schedule or configure one or more BWPs (such as one or at least two BWPs) for the terminal, and the one or more BWPs may be referred to as the first BWP.

In order to avoid a problem that transmission may not be performed due to only listening to a specific BWP (such as an active BWP), the network device may configure or schedule at least two BWPs for the terminal. The terminal may respectively listen to part or all of the configured or scheduled at least two BWPs to acquire a channel listening result of a channel of each of the at least two BWPs. Therefore, according to the channel listening result, a BWP with an idle channel is activated, to acquire a corresponding active BWP.

Step 12: activating, in a case that the channel listening result indicates that a BWP with an idle channel exists in the first BWP, at least one BWP selected from the BWP with the idle channel, to acquire a first active BWP.

If the channel listening result indicates that the idle channel of a BWP exists among the first BWP, at least one BWP selected from the BWP with the idle channels is activated, to acquire a first active BWP. The number of selected BWPs may be determined according to capability of the terminal, such as the maximum number of active BWPs simultaneously supported by the terminal.

Step 13: sending information to a network device on the first active BWP.

After the terminal activates the first active BWP, the terminal sends uplink information to the network device on the BWPs.

It should be noted that, the terminal may simultaneously support a single active BWP or at least two active BWPs for data transmission. The method of information transmission in the unlicensed band will be described below in the present embodiment in combination with different capabilities of a terminal.

A first Scenario is that the terminal only supports a single active BWP.

Although the terminal supports only a single active BWP simultaneously, the network device may still configure at least two BWPs for the terminal as candidate transmission resources. The terminal may listen to only a single BWP each time, specifically, Step 11 includes: sequentially listening to a channel of each BWP among the first bandwidth part (BWP) in the unlicensed band, to acquire the channel listening result.

Figure 2:
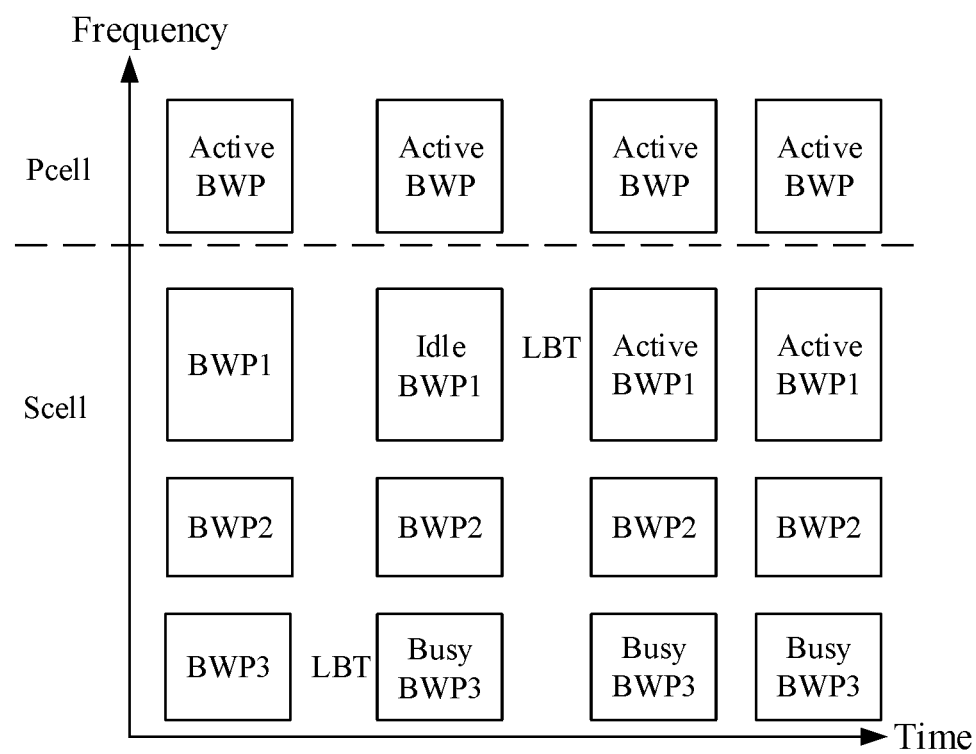
FIG. 2 is a schematic diagram illustrating resource listening in a first scenario in some embodiments of the present disclosure.

A listening sequence for the first BWP may be implemented in the following manner: listening to a channel of an active BWP, the active BWP being a BWP used in last transmission among the first BWP in the unlicensed band; in a case that the channel of the active BWP is detected as busy, sequentially listening to other BWPs among the first BWP to acquire the channel listening result. As shown in FIG. 2, the terminal preferentially listens to the active BWP (such as a BWP3 in FIG. 2) used in last transmission. In a case that the channel of the BWP is detected as busy, other BWPs (such as a BWP1 and a BWP2 in FIG. 2) are listened to sequentially.

Step 12 includes activating, among the first BWP, the BWP which channel is first detected as idle, to acquire a first active BWP.

The terminal sequentially listens to the BWPs among the first BWP according to the above manner, and activates the BWP which channel is first detected as idle, to acquire the first active BWP. Specifically, the terminal may only perform transmission on a single active BWP at a same time. The terminal has a single active BWP in a Pcell/PScell, and a single active BWP in a Scell, i.e., in the unlicensed band. In order to perform uplink transmission in the unlicensed band, the terminal sequentially listens to all BWPs on which uplink scheduling information (UL grant) or uplink pre-configuration information is received. As shown in FIG. 2, a last active BWP is listened to preferentially (see BWP3 shown in the figure). If the channel of the BWP is idle, the BWP is activated to acquire the first active BWP. If the channel of the BWP is busy, other BWPs are listened to sequentially, the BWP which channel is first detected as idle among the first BWP (see BWP1 in FIG. 2) is activated to acquire the first active BWP. It should be noted that, after the first active BWP is determined, even if there are other remaining BWPs (see BWP2 in FIG. 2) that are not listened to, there is no need to listen to the remaining BWPs at this time.

A Second Scenario is that a terminal supports at least two active BWPs.

Specifically, Step 11 includes: simultaneously listening to channels of all BWPs among the first bandwidth part (BWP) in the unlicensed band, to acquire the channel listening result. That is, the terminal listens to all BWPs (configured BWPs) corresponding to the uplink grant scheduling information and/or the pre-configured information for uplink transmission resource.

If the number of BWPs corresponding to the uplink grant scheduling information and/or the pre-configured information for uplink transmission resource received by the terminal is equal to the maximum number of the active BWPs supported by the terminal, the Step 12 includes: activating, if the channel listening result indicates that channels of the all BWPs in the first BWP are in an idle state, the all BWPs in the first BWP, to acquire first active BWPs; or, activating, if the channel listening result indicates that channels of a part of BWPs in the first BWP are in the idle state, all BWPs having idle channels, to acquire the first active BWPs, and continuing to listen to channels of remaining BWPs in the first BWP, and activating and adding, if a channel of other BWP of the remaining BWPs is detected as idle, the another BWP to the first active BWP.

Specifically, assuming that the terminal may transmit on a plurality of active BWPs at a same time, the terminal has a plurality of (i.e., Mp) active BWPs in the Pcell/PScell, and a plurality of (i.e., Ms) active BWPs in the Scell, i.e., in the unlicensed band. The number of BWPs (configured BWPs) that the network device configures for the terminal in the Pcell/PScell is Cp, and the number of BWPs configured in the Scell is Cs, that is, the number of BWPs in the first BWP is the Cs. The Mp is less than or equal to the Cp (Mp≤Cp), the Ms is less than or equal to the Cs (Ms≤Cs).

In a case that the Ms is equal to the Cs (Ms=Cs), and if the terminal acquires, by listening, that channels of all BWPs among the first BWP are idle during a first listening, the all BWPs among the first BWP are activated to acquire the first active BWPs. If the terminal acquires, by listening, that channels of a part of BWPs among the first BWP are idle during the first listening, then the terminal activates all of the BWPs having the idle channels to acquire the first active BWPs. Further, the terminal may also continue to listen to a BWP listened to as busy, the BWP is subsequently activated in a case that a channel of the BWP detected as busy is detected as idle, a new active BWP is acquired and is added to the first active BWPs. It should be noted that, all BWPs are independent, and a Maximum Channel Occupancy Time (MCOT) of each BWP is also independent from others. End time of the MCOT of each BWP in the terminal may be different. After the MCOT of a certain BWP ends, it is determined whether to continue to listen to the channel of the BWP according to the uplink grant scheduling data and/or grant free data sent by the network device. It should be noted that, difference between a listening manner in the Second Scenario and that in the First Scenario is that, the terminal no longer sequentially listens to the channels of all BWPs among the first BWP, but simultaneously listens to all BWPs corresponding to the UL grant information and/or the pre-configured information for uplink transmission resource being received, and activates all BWPs detected as having idle channels, to acquire the first active BWPs. In addition, the terminal further continues to listen to the BWP having been detected as having a busy channel, until the channel of the BWP is detected as idle or the listening expires.

If the number of BWPs scheduled by the network device for the terminal is greater than the maximum number of active BWPs supported by the terminal, Step 11 further includes: selecting the first preset number Ms of BWPs among the first BWP in the unlicensed band, and simultaneously listening to channels of the selected first preset number Ms of BWPs, to acquire the channel listening result. The Ms is a positive integer, and is less than a total number of BWPs among the first BWP in the unlicensed band.

Step 12 includes: activating the Ms BWPs if the channel listening result indicates that the channels of the Ms BWPs among the first BWP are in an idle state, to acquire the first active BWP; or, activating, if the channel listening result indicates that one or more BWPs with idle channels exist among the Ms BWPs in the first BWP, all of the one or more BWPs with idle channels, to acquire the first active BWPs, continuing to listen to channels of other BWPs among the first BWP, and activating and adding, if the channel of another BWP is detected as idle, the another BWP to the first active BWPs.

Specifically, assuming that the terminal may transmit on a plurality of active BWPs at a same time, the terminal has a plurality of (i.e., Mp) active BWPs in the Pcell/PScell, and Ms active BWPs in the Scell, i.e., in the unlicensed band. The number of BWPs (configured BWP) in the Pcell/PScell configured by the network device for the terminal is Cp, and the number of BWPs configured in the Scell is Cs, i.e., the number of BWPs in the first BWP is Cs. The Mp is less than or equal to the Cp (Mp≤Cp), the Ms is less than or equal to the Cs (Ms≤Cs). In a case that Ms is less than Cs (Ms<Cs), the terminal selects Ms BWPs among the first BWP for listening to. If the channels of the Ms BWPs are detected as idle, the Ms BWPs are activated to acquire the first active BWPs. If only part of BWPs (such as Ms') of the Ms BWPs are detected as having idle channels, all of the part of BWPs with idle channels are activated to acquire the first active BWPs. At the same time, the terminal also continues to listen to BWPs other than the Ms' BWPs among the first BWP, so as to additionally select Ms minus Ms' (Ms−Ms') BWPs with idle channels to be added to the first active BWPs. It should be noted that, there are two types for the terminal to select the Ms BWPs, i.e. active selection and passive selection. The active selection is that the network device sends UL grant corresponding to all BWPs configured for the terminal to the terminal, and the terminal selects the Ms BWPs from the BWPs for listening to. The passive selection is that the network device selects Ns BWPs from all BWPs configured for the terminal, UL grants corresponding to the Ns BWPs are sent to the terminal, and the terminal listens to BWPs corresponding to UL grants being received.

Figure 3:
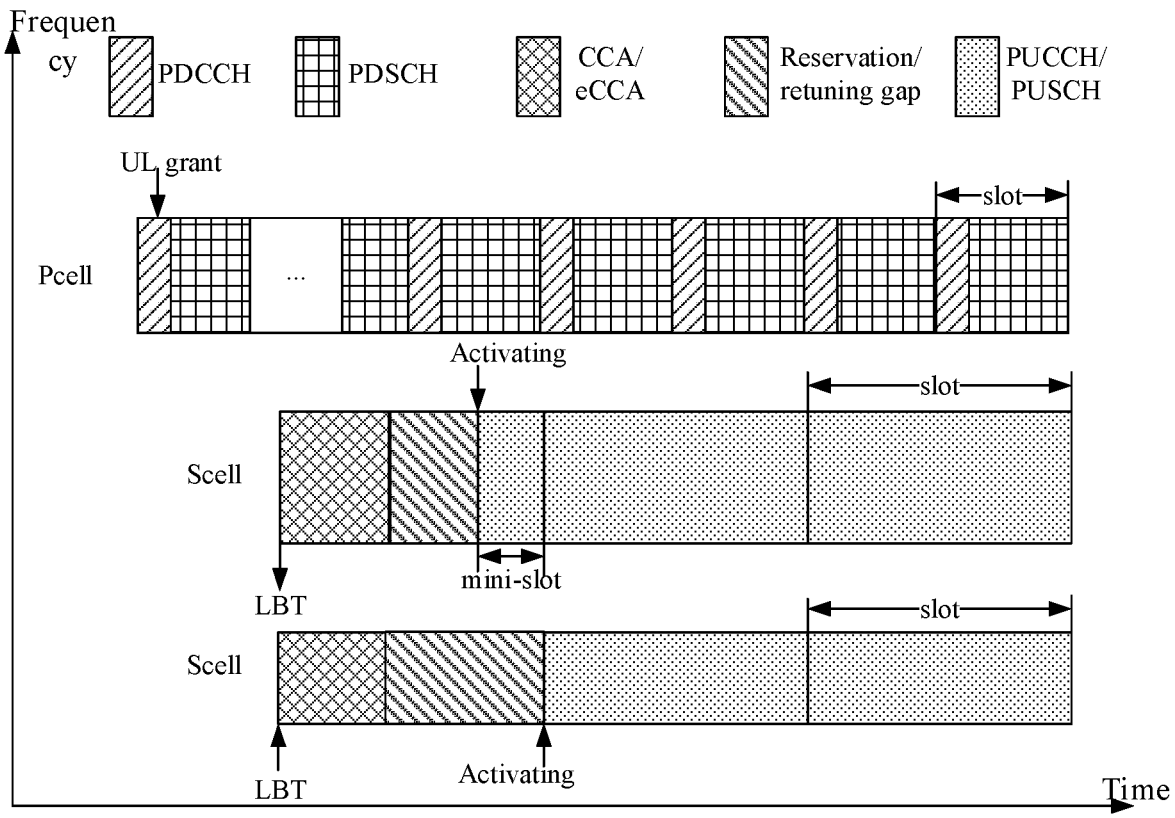
FIG. 3 is a schematic diagram illustrating resource mapping in information transmission in some embodiments of the present disclosure.

The above describes how the network device listens and determines the first active BWPs in the Scenarios where the terminal supports only a single active BWP and at least two active BWPs. In addition, before the terminal listens to the first BWP, the method further includes: receiving the uplink grant scheduling information and/or the pre-configured information for uplink transmission resource corresponding to the at least one BWP in the unlicensed band sent by the network device; determining the corresponding first BWP according to the uplink grant scheduling information and/or the pre-configured information for uplink transmission resource. That is, the terminal receives the uplink grant scheduling information and/or the pre-configured information for uplink transmission resource sent by the network device, and parses the uplink grant scheduling information and/or the pre-configured information for uplink transmission resource to determine the first BWP. As shown in FIG. 3, the network device needs to send to the terminal UL grants corresponding to N BWPs in advance, wherein the N is less than and equal to the Cs (NICs). In this way, after the terminal detects a BWP with an idle channel, the terminal may perform uplink transmission according to the sent UL grant of the BWP or the sent pre-configured information for uplink transmission resource. The data information of UL grants of different BWPs sent by the network device may be the same, that is, the same data is transmitted and scheduled on different BWPs.

Further, Step 13 includes: in a next feasible transmission time unit after activating the first active BWP, sending information to the network device on the first active BWP; wherein the transmission time unit includes: a slot or a mini-slot. After the terminal activates the first active BWP, in a next feasible transmission time unit of the Scell, the terminal sends uplink information to the network device on the first active BWP. As shown in FIG. 3, if scheduling of the network device is based on a slot, the terminal starts to send a reservation signal after the terminal activates the first active BWP, and starts to send uplink information from the next slot according to the UL grant information. If scheduling of the network device is based on a mini-slot, the network device sends UL grant information corresponding to one or more types of mini-slots for each BWP in advance, the terminal sends a reservation signal after the terminal activates the first active BWP, and starts to perform uplink transmission at a time point when transmission is allowed in a next mini-slot. It should be noted that, the network device needs to perform receiving on all BWPs where an UL grant is sent. For the Scenario where the terminal supports only a single active BWP, once the network device receives data on a certain BWP, it means that the terminal selects or activates the BWP, subsequently, the network device only needs to receive data on the BWP in the MCOT of the BWP.

In the method of information transmission in the unlicensed band according to some embodiments of the present disclosure, for uplink transmission, the terminal listens to a plurality of configured BWPs in the unlicensed band, and activates the BWP with a channel detected as idle, to acquire the first active BWP, and the terminal also sends uplink information to the network device on the first active BWP. In this way, by listening to the plurality of BWPs, in a case that a certain BWP is busy, other BWPs may be used for transmission, thereby improving resource utilization.

The above embodiments introduce the method of information transmission in an unlicensed band in different Scenarios. The corresponding terminal will be further described below with reference to the accompanying drawings.

Figure 4:
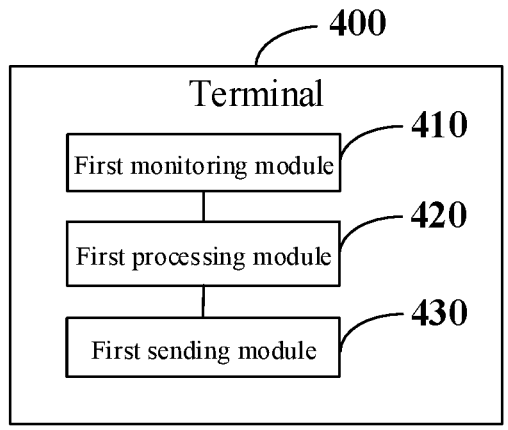
FIG. 4 is a schematic structural diagram illustrating modules of a terminal in some embodiments of the present disclosure.

As shown in FIG. 4, a terminal 400 in some embodiments of the present disclosure may implement details of the method of the above embodiment, i.e., listening to a channel of a first bandwidth part (BWP) in an unlicensed band to acquire a channel listening result; activating, if the channel listening result indicates that a BWP with an idle channel exists among the first BWP, at least one BWP selected from the BWP with the idle channel, to acquire a first active BWP; sending information to a network device on the first active BWP, and may achieve the same effect. The terminal 1100 specifically includes the following functional modules: a first listening module 410, a first processing module 420, and a first sending module 430.

The first listening module 410 is used to listen to a channel of a first bandwidth part (BWP) in an unlicensed band, to acquire a channel listening result; wherein, the first BWP is at least one BWP corresponding to received uplink grant scheduling information and/or received pre-configured information for uplink transmission resource.

The first processing module 420 is used to activate, if the channel listening result indicates that a BWP with an idle channel exists among the first BWP, at least one BWP selected from the BWP with the idle channel, so as to acquire a first active BWP.

The first sending module 430 is used to send information to a network device on the first active BWP.

The first listening module 410 includes: a first listening unit, used to sequentially listen to channels of BWPs among the first bandwidth part (BWP) in the unlicensed band, to acquire the channel listening result.

The first listening unit includes: a first listening subunit, used to listen to a channel of an active BWP, the active BWP being a BWP used in last transmission among the first BWP in the unlicensed band; a second listening subunit, used to sequentially listen to remaining BWPs among the first BWP to acquire the channel listening result if the channel of the active BWP is detected as busy.

The first processing module 420 includes: a first activating unit, used to activate a BWP which channel is first detected as idle among the first BWP, to acquire the first active BWP.

The first listening module 410 further includes: a second listening unit, used to simultaneously listen to channels of all BWPs among the first bandwidth part (BWP) in the unlicensed band, to acquire the channel listening result; or, a third listening unit, used to select first preset number Ms of BWPs among the first BWP in the unlicensed band, and simultaneously listen to channels of the selected first preset number Ms of BWPs, to acquire the channel listening result, wherein Ms is a positive integer, and is less than a total number of BWPs among the first BWP in the unlicensed band.

The first processing module 420 further includes: a second activating unit, used to activate, if the channel listening result indicates that channels of all BWPs among the first BWP are in an idle state, the all BWPs among the first BWP, to acquire the first active BWP; or, a third activating unit, used to activate, if the channel listening result indicates that the channels of part of BWPs among the first BWP are idle, all of the part of BWPs having the idle channels, to acquire the first active BWPs, continue to listen to channels of remaining BWPs among the first BWP, and activate and add, if a channel of another BWP is detected as idle, the another BWP to the first active BWPs.

The first processing module 420 further includes: a fourth activating unit, used to activate Ms BWPs among the first BWP if the channel listening result indicates that all channels of the Ms BWPs among the first BWP are in an idle state, to acquire the first active BWPs; or, a fifth activating unit, used to activate, if the channel listening result indicates that one or more BWPs with idle channels exist among the Ms BWPs of the first BWP, all of the one or more BWPs with idle channels to acquire the first active BWPs, continue to listen to channels of other BWPs among the first BWP, and activate and add, if a channel of another BWP is detected as idle, the another BWP to the first active BWPs.

The terminal 400 further includes: a first receiving module, used to receive uplink grant scheduling information and/or pre-configured information for uplink transmission resource of at least one BWP in the unlicensed band sent by the network device; a determining module, used to determine a corresponding first BWP according to the uplink grant scheduling information and/or the pre-configured information for uplink transmission resource.

The first sending module 430 includes: a sending unit, used to, in a next feasible transmission time unit after determining the first active BWP, send information to the network device on the first active BWP; wherein the transmission time unit includes a slot or a mini-slot.

It should be noted that, for a terminal according to some embodiments of the present disclosure, for uplink transmission, the terminal listens to a plurality of configured BWPs in the unlicensed band, and activates the BWP detected as having an idle channel, to acquire the first active BWP, and the terminal also sends uplink information to the network device on the first active BWP. In this way, by listening to the plurality of BWPs, in a case that a certain BWP is busy, other BWPs may be used for transmission, thereby improving resource utilization.

Figure 5:
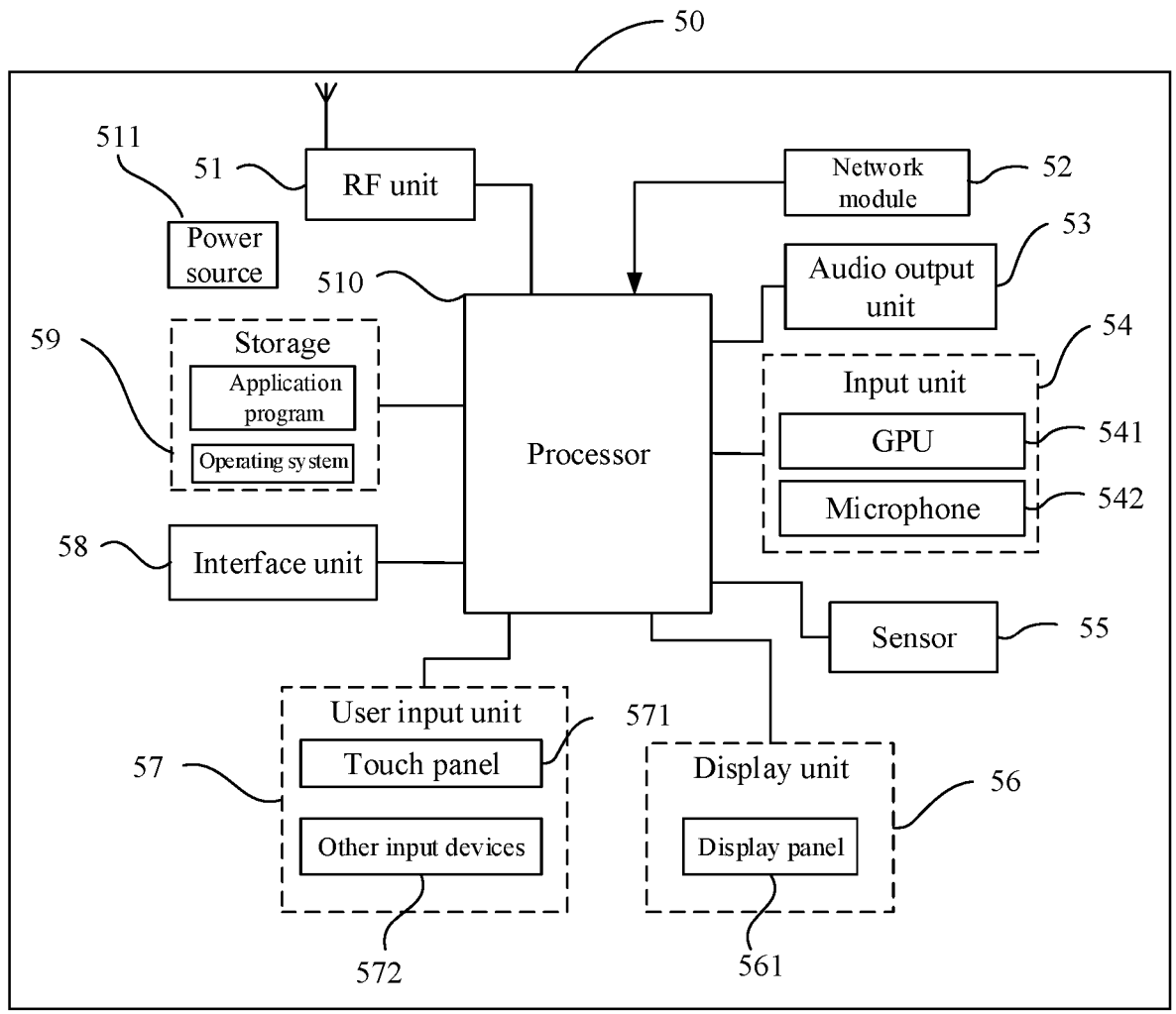
FIG. 5 is a block diagram of a terminal in some embodiments of the present disclosure.

Further, in order to better achieve the above purpose, FIG. 5 is a schematic diagram of a hardware structure of a terminal that implements various embodiments of the present disclosure. The terminal 50 includes, but is not limited to, a radio frequency (RF) unit 51, a network module 52, and an audio output unit 53, an input unit 54, a sensor 55, a display unit 56, a user input unit 57, an interface unit 58, a storage 59, a processor 510, and a power source 511 and other components. Those skilled in the art may understand that a structure of the terminal shown in FIG. 5 does not constitute a limitation on the terminal, and the terminal may include more or fewer components than those shown in the figure, or some combined components, or different arrangements of components. In some embodiments of the present disclosure, the terminal includes, but is not limited to, a mobile phone, a tablet computer, a notebook computer, a palmtop computer, a car-mounted terminal, a wearable device, a pedometer, and the like.

The radio frequency unit 51 is used to receive and send signals under control of the processor 510. The processor 510 is used to calls a computer program stored in the storage 59 to implement the method implemented by various modules shown in FIG. 4.

The terminal according to some embodiments of the present disclosure listens, for uplink transmission, a plurality of configured BWPs in the unlicensed band, and activates the BWP detected as having an idle channel, to acquire the first active BWP, and the terminal also sends uplink information to the network device on the first active BWP. In this way, by listening to the plurality of BWPs, in a case that a certain BWP is busy, other BWPs may be used for transmission, thereby improving resource utilization.

It should be understood that, in some embodiments of the present disclosure, the radio frequency unit 51 may be used for receiving and transmitting a signal in a process of sending and/or receiving information or in a process of calling. Specifically, after receiving downlink data from a base station, the radio frequency unit 51 transfers the downlink data to the processor 510; and sends uplink data a base station. In general, the radio frequency unit 51 includes, but is not limited to, an antenna, at least one amplifier, a transceiver, a coupler, a low noise amplifier, a duplexer, and the like. In addition, the radio frequency unit 51 may also communicate with a network and other devices through a wireless communication system.

The terminal provides a wireless broadband internet access for a user via the network module 52, such as assisting the user in sending and receiving emails, surfing web pages, accessing streaming media, and the like.

The audio output unit 53 may convert audio data received by the radio frequency unit 51 or the network module 52 or stored in the storage 59 into an audio signal and output as sound. The audio output unit 53 may also provide audio output (e.g., a call signal reception sound, a message reception sound, etc.) related to a specific function performed by the terminal 1200. The audio output unit 53 includes a speaker, a buzzer, a receiver, and the like.

The input unit 54 is used to receive an audio or video signal. The input unit 54 may include a graphics processor (Graphics Processing Unit (GPU)) 541 and a microphone 542. The graphics processor 541 processes image data of still pictures or video obtained by an image capture device (such as a camera) in a video capture mode or an image capture mode. The processed image frame may be displayed on the display unit 56. Image frames processed by the graphics processor 541 may be stored in the storage 59 (or another storage medium) or sent via the radio frequency unit 51 or the network module 52. The microphone 542 may receive sound and be capable of processing such sound as audio data. The processed audio data may be converted, in a case of a telephone call mode, into a format output transmittable to a mobile communication base station via the radio frequency unit 51.

The terminal 50 also includes at least one sensor 55, such as a light sensor, a motion sensor, and other sensors. In particular, the light sensor includes: an ambient light sensor that can adjust the brightness of the display panel 561 according to the intensity of ambient light; and a proximity sensor that can turn off the display panel 561 and/or a backlight in a case that the terminal 50 moves close to an ear. As one type of motion sensor, an accelerometer sensor can detect a magnitude of acceleration in various directions (generally in three axis directions), detect a magnitude and a direction of gravity when the accelerometer sensor is stationary, and can be used to recognize a posture of a terminal (such as a horizontal/vertical screen switching, related games, magnetometer attitude calibration), vibration-recognition related functions (such as a pedometer, a knock); the sensor 55 may further include a fingerprint sensor, a pressure sensor, an iris sensor, a molecular sensor, a gyroscope, a barometer, a hygrometer, a thermometer, an infrared sensor, and the like, which will not be described here.

The display unit 56 is used to display information inputted by a user or information provided to the user. The display unit 56 may include a display panel 561. The display panel 561 is configured in a form of a Liquid Crystal Display (LCD) and an Organic Light-Emitting Diode (OLED) or the like.

The user input unit 57 may be operable to receive inputted numeric or character information and to generate key signal inputs related to user settings and function control of the terminal. Specifically, the user input unit 57 includes a touch panel 571 and other input devices 572. The touch panel 571, also referred to as a touch screen, may collect touch operations on or near the touch panel by the user (such as touch operations of the user using any suitable object or accessory, such as a finger, a stylus, and the like on or near the touch panel 571). The touch panel 571 may include two parts, i.e., a touch detector and a touch controller, wherein the touch detector detects a touch orientation of the user, detects a signal caused by the touch operation, and transmits the signal to the touch controller; the touch controller receives touch information from the touch detector, converts the touch information into contact coordinates, sends the contact coordinates to the processor 510, receives a command from the processor 510, and executes the command from the processor 510. In addition, the touch panel 571 may also be implemented in various types such as a resistive type, a capacitive type, an infrared ray type, and a surface acoustic wave type. The user input unit 57 may also include other input devices 572 in addition to the touch panel 571. Specifically, other input devices 572 may include, but are not limited to, a physical keyboard, function buttons (such as volume control buttons, switch buttons, etc.), a trackball, a mouse, and an operating lever, which are not described herein.

Further, the touch panel 571 may be overlaid on the display panel 561. When the touch panel 571 detects a touch operation on or near the touch panel 571, the touch panel 571 transmits information of the touch operation to the processor 510 to determine a type of a touch event. The processor 510 then provides a corresponding visual output on the display panel 561 according to the type of the touch event. Although in FIG. 5, the touch panel 571 and the display panel 561 are two separate components used to implement input and output functions of the terminal, the touch panel 571 and the display panel 561 in some embodiments may be integrated to realize the input and output functions of the terminal, and are not limited herein.

The interface unit 58 is an interface for connecting an external device to the terminal 50. For example, the external device may include a wired or wireless headset port, an external power source (or a battery charger) port, a wired or wireless data port, a memory card port, a port for connecting a device having an identification module, an audio input/output (I/O) port, a video I/O port, a headphone port, etc. The interface unit 58 may be used to receive input (e.g., data information, power and the like) from an external device and transmit the received input to one or more elements within the terminal or may be used to transmit data between the terminal 50 and an external device.

The storage 59 may be used to store software programs and various types of data. The storage 59 may mainly include a storage program region and a storage data region, wherein the storage program region may store an operating system, an application program required by at least one function, such as a sound playing function, an image playing function, and the like; the storage data region may store data (such as audio data, phonebook, etc.) created according to usage of a mobile phone. Further, the storage 59 may include a high-speed random access memory, and may also include a non-volatile storage, such as at least one disk storage device, a flash memory device, or other volatile solid-state storage devices.

The processor 510 is a control center of the terminal, connects various parts of the entirety of the terminal using various interfaces and lines, and the processor 510 performs various functions of the terminal and processes data, by running or executing a software program and/or a module stored in the storage 59 and invoking data stored in the storage 59, thereby integrally monitoring the terminal. The processor 510 may include one or more processing units; optionally, the processor 510 may be integrated with an application processor and a modem processor, wherein the application processor primarily handles operating systems, user interfaces, application programs, and the like, and the modem processor primarily handles wireless communication. It will be appreciated that the above modem processor may not be integrated into the processor 510.

The terminal 50 may also include a power source 511, such as a battery, for powering various components, optionally the power source 511 may be logically connected to the processor 510 through a power management system. Thereby, functions of charging management, discharging management, and power consumption management are realized by the power management system.

In addition, the terminal 50 includes some functional modules that are not shown and will not be described again here.

Optionally, embodiments of the present disclosure also provide a terminal. The terminal includes a processor 510, a storage 59, and a computer program stored on the storage 59 and executable by the processor 510. When the computer program is executed by the processor 510, the processor 510 implements each process of the method embodiments of information transmission in the unlicensed band, and the same technical effect can be achieved. In order to avoid repetition, the detailed description thereof is omitted here.

The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a Radio Access Network (RAN), and the wireless terminal may be a mobile terminal, such as a mobile phone (or referred to as a "cellular" phone) and a computer having a mobile terminal, for example, a portable device, a pocket device, a handheld device, a computer built-in device or an in-vehicle mobile device that exchanges language and/or data with a wireless access network, for example, a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal may also be referred to as a system, a Subscriber Unit, a Subscriber Station, a Mobile Station, a Mobile, a Remote Station, a Remote Terminal, and an Access Terminal, a User Terminal, a User Agent, or a User Equipment or a User Device, which are not limited herein.

Some embodiments of the present disclosure also provides a computer readable storage medium. A computer program is stored on the computer readable storage medium, and when the computer program is executed by a processor, the processor implements various processes in some embodiments of the method of information transmission in the unlicensed band, and the same technical effect may be achieved, which will not be repeated herein to avoid repetition. The computer readable storage medium may be, for example, a Read-Only Memory (ROM), a Random Access Memory (RAM), a magnetic disk or an optical disk, etc.

The above embodiments introduce the method of information transmission in the unlicensed band from a terminal side in different Scenarios. The method of information transmission in the unlicensed band on a corresponding network device side and the terminal will be further described below with reference to the accompanying drawings.

Figure 6:
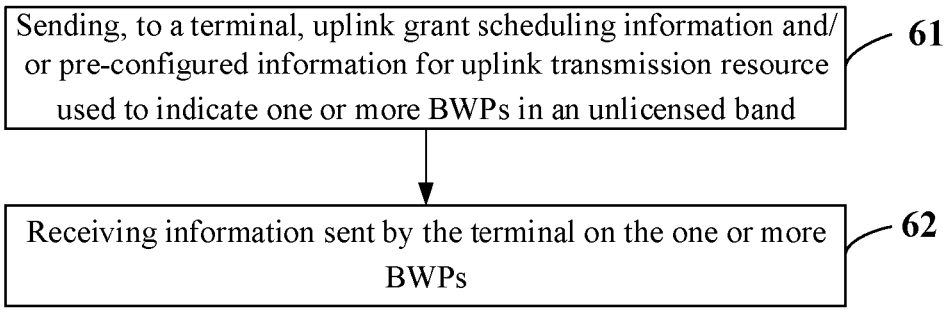
FIG. 6 is a schematic flowchart illustrating an information transmission method on a network device side in some embodiments of the present disclosure.

As shown in FIG. 6. Some embodiments of the present disclosure further provides a method of information transmission in an unlicensed band. The method is applied to a network device and includes:

Step 61: sending, to a terminal, uplink grant scheduling information and/or pre-configured information for uplink transmission resource used to indicate at least one BWP in an unlicensed band.

After the network device configures at least one BWP for the terminal, the network device sends the uplink grant scheduling information or pre-configured information for uplink transmission resource corresponding to these BWPs to the terminal, so that the terminal knows which BWPs need to be listened to.

Step 62: receiving information sent by the terminal on the at least one BWP.

A transmission time unit includes: a slot or a mini-slot. After the network device sends the uplink grant scheduling information and/or the pre-configured information for uplink transmission resource to the terminal, the network device needs to receive on all BWPs for which UL grants are sent. Once data is received on a certain BWP, it means that the terminal selects or activates the BWP, and subsequently, the network device only needs to receive data on the BWP in an MCOT of the BWP.

The above embodiments introduce the method of information transmission in an unlicensed band in different Scenarios. A corresponding network device will be further described below with reference to the accompanying drawings.

Figure 7:
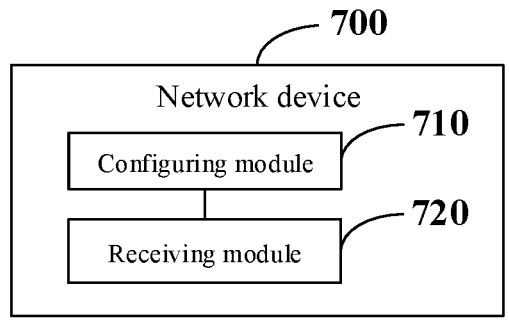
FIG. 7 is a schematic structural diagram illustrating modules of a network device in some embodiments of the present disclosure.

As shown in FIG. 7, the network device 700 of some embodiments of the present disclosure may implement details of the method in the above embodiment including: sending, to a terminal, uplink grant scheduling information and/or pre-configured information for uplink transmission resource used to indicate at least one BWP in an unlicensed band; receiving information sent by the terminal on the at least one BWP. The network device 700 may achieve the same effect. The network device 700 specifically includes the following functional modules: a configuring module 710, used to send to a terminal uplink grant scheduling information and/or pre-configured information for uplink transmission resource used to indicate at least one BWP in an unlicensed band; a second receiving module 720, used to receive information sent by the terminal on the at least one BWP, wherein a transmission time unit includes a slot or a mini-slot.

It should be noted that a division of modules of the above network device and the terminal is only a division in terms of logical functions. In actual implementation, the modules may be entirely or partially integrated into one physical entity, or may be physically separated. The modules may all be implemented in a form of software called by a processing component; or may all be implemented in a form of hardware. Optionally, some of the modules may be implemented in the form of software called by a processing component, and some of the modules are implemented in the form of hardware. For example, the determining module may be a processing component arranged independently, or may be integrated in a chip of the above-mentioned devices. The determining module may also be stored in the storage of the above device in a form of program codes called and executed by a processing component of the above device to implement the function of the determining module. Implementation of other modules is similar. In addition, all or a part of these modules may be integrated or implemented independently. The processing components described herein may be an integrated circuit having a processing capability of signals. In an implementation process, each step of the above method or each of the above modules may be completed by an integrated logic circuit in hardware in the processor component or by an instruction in a form of software.

For example, the above modules may be one or more integrated circuits used to implement the above method, such as one or more Application Specific Integrated Circuits (ASICs), or one or more digital signal processors (DSP), or, one or more Field Programmable Gate Arrays (FPGAs), etc. As another example, when one of the above modules is implemented in a form of program codes invoked by a processing component, the processing component may be a general purpose processor, such as a Central Processing Unit (CPU) or another processor capable of calling the program codes. As another example, these modules may be integrated and implemented in a form of a 'system-on-a-chip' (SOC).

In order to better achieve the above purpose, some embodiments of the present disclosure also provide a network device. The network device includes a processor, a storage, and a computer program stored on the storage and executable by the processor. When the computer program is executed by the processor, the processor implements the steps of the method of information transmission in the unlicensed band as described above. Some embodiments of the present disclosure also provide a computer readable storage medium including a computer program stored thereon. When the computer program is executed by the processor, the processor implements the steps of the method of information transmission in the unlicensed band as described above.

Figure 8:
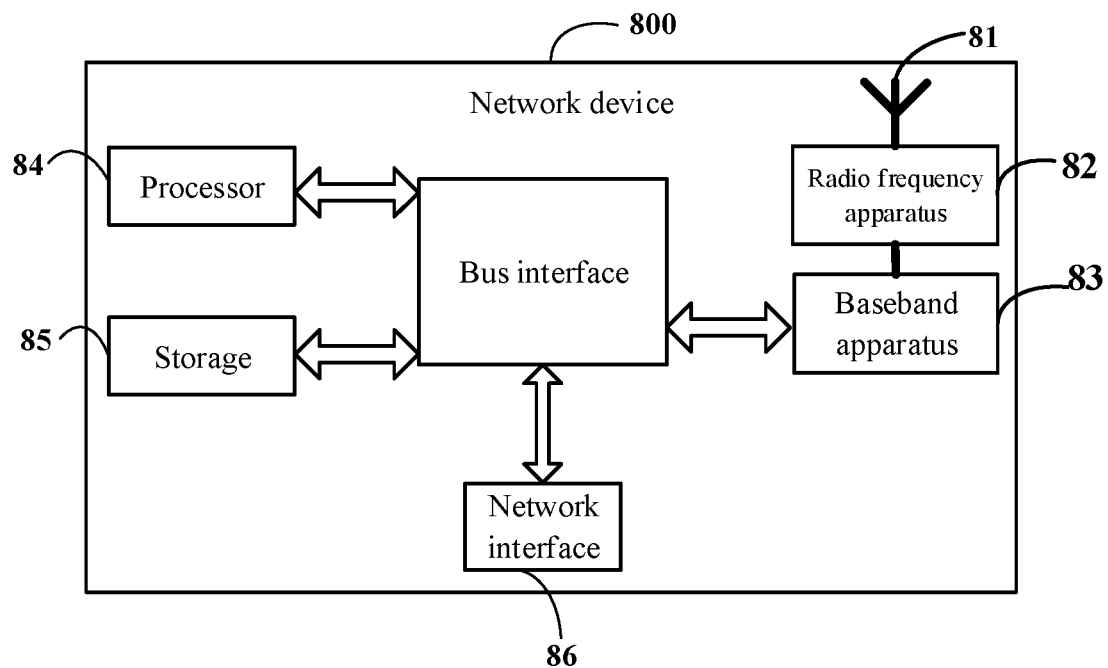
FIG. 8 is a block diagram illustrating a network device in some embodiments of the present disclosure.

Specifically, some embodiments of the present disclosure also provide a network device. As shown in FIG. 8, the network device 800 includes: an antenna 81, a radio frequency (RF) apparatus 82, and a baseband apparatus 83. The antenna 81 is connected to the radio frequency apparatus 82. In an uplink direction, the radio frequency apparatus 82 receives information via the antenna 81 and transmits the received information to the baseband apparatus 83 for processing. In a downlink direction, the baseband apparatus 83 processes information to be transmitted and transmits the processed information to the radio frequency apparatus 82. The radio frequency apparatus 82 processes the received information and transmits the processed received information via the antenna 81.

A frequency band processing device may be arranged in the baseband apparatus 83, and the method performed by the above network device in the embodiments may be implemented in the baseband apparatus 83 which includes a processor 84 and a storage 85.

The baseband apparatus 83 may include, for example, at least one baseband board on which a plurality of chips are disposed, as shown in FIG. 8, and one of the chips is, for example, the processor 84 connected to the storage 85 to call a program in the storage 85 to perform an operation of the network device shown in the above method embodiment.

The baseband apparatus 83 may further include a network interface 86 for interacting with the radio frequency apparatus 82, and the interface is, for example, a common public radio interface (referred to as CPRI).

The processor here may be a processor or a collective name of a plurality of processing components. For example, the processor may be a CPU, an ASIC, or one or more integrated circuits used to implement the method performed by the above network device, such as one or more digital signal processors (DSPs), or one or more field programmable gate arrays (FPGAs), etc. The storage element may be a storage or a collective name of a plurality of storage elements.

The storage 85 may be either a volatile storage or a non-volatile storage, or may include both the volatile storage and the non-volatile storage. The non-volatile storage may be a Read-Only Memory (ROM), a Programmable ROM (PROM), an Erasable PROM (EPROM), an Electrically EPROM (EEPROM) or a flash memory. The volatile storage may be a Random Access Memory (RAM) that acts as an external cache. By way of example and not limitation, many forms of RAMs are available, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DRRAM). The storage 85 described in the present application is intended to include, but is not limited to, these and any other suitable types of storage.

Specifically, the network device of some embodiments of the present disclosure further includes: a computer program stored in the storage 85 and executable by the processor 84. The processor 84 calls the computer program in the storage 85 to perform the method performed by each module shown in FIG. 7.

The network device may be a Base Transceiver Station (BTS) in a Global System of Mobile communication (GSM) or a Code Division Multiple Access (CDMA) system, a NodeB (NB) in a Wideband Code Division Multiple Access (WCDMA) system, an Evolutional Node B (eNB or eNodeB), a relay station or an access point in a LTE system, or a base station in a further 5G network, or the like, which is not limited thereto.

The network device in some embodiments of the present disclosure listens to a plurality of configured BWPs in the unlicensed band, and performs transmission on BWPs with idle channels. For downlink transmission, the network device listens and determines the first active BWP, and sends downlink information to the terminal through the first active BWP. In this way, by listening to a plurality of BWPs, other BWPs may be used for transmission in a case that a certain BWP is busy, thereby improving resource utilization.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In the embodiments provided in the present application, it should be understood that the disclosed devices and methods may be implemented in other manners. For example, the device embodiments described above are merely illustrative. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solutions of the embodiments.

In addition, each functional unit in various embodiments of the present disclosure may be integrated into one processing unit, or each unit may exist physically separately, or two or more units may be integrated into one unit.

If the functions are implemented in the form of software functional units and sold or used as an independent product, the software functional units may also be stored in a computer readable storage medium. Based upon such understanding, essence of the technical solutions of the present disclosure or a part of the technical solutions of the present disclosure contributing to the prior art or a part of the technical solutions may be embodied in the form of a computer software product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a removable hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents of the present disclosure. Also, the steps of performing the above-described series of processes may naturally be performed in a chronological order or in an order illustrated, but not necessarily be required to be performed in the chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by these of ordinary skills in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including program codes for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, various components or steps may be decomposed and/or recombined. The decomposition and/or recombination should be considered as equivalents of the present disclosure. Also, the steps of performing the series of processes described above may naturally be performed in the chronological order or in the order illustrated, but not necessarily be required to be performed in the chronological order. Certain steps may be performed in parallel or independently of one another.

The descriptions above are optional embodiments of the present disclosure. It should be noted that those skilled in the art may make various improvements and the embellishments within the scope of the present disclosure, and the various improvements and the embellishments shall be within the protection scope of the present disclosure.

What is claimed is:

1. A method of information transmission in an unlicensed band, applied to a terminal and comprising:
listening to a channel of a first bandwidth part (BWP) in an unlicensed band, to acquire a channel listening result, wherein the first BWP is one or more BWPs corresponding to received uplink grant scheduling information and/or received pre-configured information for uplink transmission resource;
activating, in a case that the channel listening result indicates that a BWP with an idle channel exists in the first BWP, at least one BWP selected from the BWP with the idle channel, to acquire a first active BWP;
sending information to a network device on the first active BWP;
wherein, listening to the channel of the first BWP in the unlicensed band, to acquire the channel listening result, comprises:
simultaneously listening to channels of all BWPs among the first BWP in the unlicensed band, to acquire the channel listening result;
wherein, in a case of simultaneously listening to channels of all BWPs among the first BWP in the unlicensed band to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that channels of a part of BWPs in the first BWP are in the idle state, all BWPs having idle channels, to acquire the first active BWP, and continuing to listen to channels of remaining BWPs in the first BWP, and activating and adding, in a case that a channel of other BWP of the remaining BWPs is detected as idle, the other BWP to the first active BWP.

2. The method of information transmission in an unlicensed band according to claim 1, wherein, activating the at least one BWP selected from the BWP with the idle channel to acquire the first active BWP, comprises:
activating, among the first BWP, a BWP which channel is first detected as idle, to acquire the first active BWP.

3. The method of information transmission in the unlicensed band according to claim 1, wherein, in a case of simultaneously listening to channels of all BWPs among the first BWP in the unlicensed band to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that channels of all BWPs among the first BWP are in an idle state, the all BWPs among the first BWP, to acquire the first active BWP.

4. The method of information transmission in an unlicensed band according to claim 1, wherein, in a case of selecting the first preset number Ms of BWPs among the first BWP in the unlicensed band and simultaneously listening channels of the selected first preset number Ms of BWPs to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that the channels of the Ms BWPs among the first BWP are in an idle state, the Ms BWPs to acquire the first active BWP;
or,
activating, in a case that the channel listening result indicates that one or more BWPs with idle channels exist among the Ms BWPs of the first BWP, all of the one or more BWPs with idle channels, to acquire the first active BWP, continuing to listen to channels of other BWPs among the first BWP, and activating and adding, in a case that a channel of another BWP is detected as idle, the another BWP to the first active BWP.

5. The method of information transmission in an unlicensed band according to claim 1, wherein, prior to listening to the channel of the first BWP in the unlicensed band to acquire the channel listening result, the method further comprises:
receiving uplink grant scheduling information and/or pre-configured information for uplink transmission resource corresponding to one or more BWPs in the unlicensed band sent by the network device;

determining a first BWP according to the uplink grant scheduling information and/or the pre-configured information for uplink transmission resource.

6. The method of information transmission in an unlicensed band according to claim 1, wherein, sending the information to the network device on the first active BWP comprises:
in a next feasible transmission time unit after activating the first active BWP, sending the information to the network device on the first active BWP; wherein the transmission time unit comprises a slot or a mini-slot.

7. The method of information transmission in an unlicensed band according to claim 1, wherein, listening to the channel of the first BWP in the unlicensed band, to acquire the channel listening result, further comprises:
selecting the first preset number Ms of BWPs among the first BWP in the unlicensed band, and simultaneously listening to channels of the selected first preset number Ms of BWPs, to acquire the channel listening result, wherein Ms is a positive integer and is less than the total number of BWPs among the first BWP in the unlicensed band.

8. A terminal, comprising:
a processor, a storage, and a computer program stored on the storage and executable by the processor, wherein in a case that the computer program is executed by the processor, the processor implements following steps:
listening to a channel of a first bandwidth part (BWP) in an unlicensed band, to acquire a channel listening result, wherein the first BWP is one or more BWPs corresponding to received uplink grant scheduling information and/or received pre-configured information for uplink transmission resource;
activating, in a case that the channel listening result indicates that a BWP with an idle channel exists in the first BWP, at least one BWP selected from the BWP with the idle channel, to acquire a first active BWP;
sending information to a network device on the first active BWP;
wherein, listening to the channel of the first BWP in the unlicensed band, to acquire the channel listening result, comprises:
simultaneously listening to channels of all BWPs among the first BWP in the unlicensed band, to acquire the channel listening result;
wherein, in a case of simultaneously listening to channels of all BWPs among the first BWP in the unlicensed band to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that channels of a part of BWPs in the first BWP are in the idle state, all BWPs having idle channels, to acquire the first active BWP, and continuing to listen to channels of remaining BWPs in the first BWP, and activating and adding, in a case that a channel of other BWP of the remaining BWPs is detected as idle, the other BWP to the first active BWP.

9. The terminal according to claim 8, wherein, activating the at least one BWP selected from the BWP with the idle channel to acquire the first active BWP, comprises:
activating, among the first BWP, a BWP which channel is first detected as idle, to acquire the first active BWP.

10. The terminal according to claim 8, wherein, in a case of simultaneously listening to channels of all BWPs among the first BWP in the unlicensed band to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that channels of all BWPs among the first BWP are in an idle state, the all BWPs among the first BWP, to acquire the first active BWP.

11. The terminal according to claim 8, wherein, in a case of selecting the first preset number Ms of BWPs among the first BWP in the unlicensed band and simultaneously listening channels of the selected first preset number Ms of BWPs to acquire the channel listening result,
activating, in a case that the channel listening result indicates that the BWP with the idle channel exists in the first BWP, the at least one BWP selected from the BWP with the idle channel to acquire the first active BWP, comprises:
activating, in a case that the channel listening result indicates that the channels of the Ms BWPs among the first BWP are in an idle state, the Ms BWPs to acquire the first active BWP;
or,
activating, in a case that the channel listening result indicates that one or more BWPs with idle channels exist among the Ms BWPs of the first BWP, all of the one or more BWPs with idle channels, to acquire the first active BWP, continuing to listen to channels of other BWPs among the first BWP, and activating and adding, in a case that a channel of another BWP is detected as idle, the another BWP to the first active BWP.

12. The terminal according to claim 8, wherein, prior to listening to the channel of the first BWP in the unlicensed band to acquire the channel listening result, the processor further executes the computer program to implement following steps:
receiving uplink grant scheduling information and/or pre-configured information for uplink transmission resource corresponding to one or more BWPs in the unlicensed band sent by the network device;
determining a first BWP according to the uplink grant scheduling information and/or the pre-configured information for uplink transmission resource.

13. The terminal according to claim 8, wherein, sending the information to the network device on the first active BWP comprises:
in a next feasible transmission time unit after activating the first active BWP, sending the information to the network device on the first active BWP; wherein the transmission time unit comprises a slot or a mini-slot.

14. The terminal according to claim 8, wherein, listening to the channel of the first BWP in the unlicensed band, to acquire the channel listening result, further comprises:
selecting the first preset number Ms of BWPs among the first BWP in the unlicensed band, and simultaneously listening to channels of the selected first preset number Ms of BWPs, to acquire the channel listening result, wherein Ms is a positive integer and is less than the total number of BWPs among the first BWP in the unlicensed band.

15. A non-transitory computer readable storage medium, comprising:
- a computer program stored on the computer readable storage medium, wherein in a case that the computer program is executed by a processor, the processor implements following steps:
- listening to a channel of a first bandwidth part (BWP) in an unlicensed band, to acquire a channel listening result, wherein the first BWP is one or more BWPs corresponding to received uplink grant scheduling information and/or received pre-configured information for uplink transmission resource;
- activating, in a case that the channel listening result indicates that a BWP with an idle channel exists in the first BWP, at least one BWP selected from the BWP with the idle channel, to acquire a first active BWP;
- sending information to a network device on the first active BWP;
- wherein, listening to the channel of the first BWP in the unlicensed band, to acquire the channel listening result, comprises:
- simultaneously listening to channels of all BWPs among the first BWP in the unlicensed band, to acquire the channel listening result;
- wherein, in a case of simultaneously listening to channels of all BWPs among the first BWP in the unlicensed band to acquire the channel listening result,
- activating, in a case that the channel listening result indicates that the BWP with the idle channel exists in the first BWP, the at least one BWP selected from the BWP with the idle channel to acquire the first active BWP, comprises:
- activating, in a case that the channel listening result indicates that channels of a part of BWPs in the first BWP are in the idle state, all BWPs having idle channels, to acquire the first active BWP, and continuing to listen to channels of remaining BWPs in the first BWP, and activating and adding, in a case that a channel of other BWP of the remaining BWPs is detected as idle, the other BWP to the first active BWP.

16. The non-transitory computer readable storage medium according to claim 15, wherein, activating the at least one BWP selected from the BWP with the idle channel to acquire the first active BWP, comprises:
- activating, among the first BWP, a BWP which channel is first detected as idle, to acquire the first active BWP.

* * * * *